United States Patent
Blumenthal et al.

(10) Patent No.: US 8,952,307 B2
(45) Date of Patent: Feb. 10, 2015

(54) SPATIAL STRUCTURE ASSEMBLIES

(75) Inventors: Yanir Blumenthal, Kfar Saba (IL);
Oren Gadot, Nes Ziona (IL); Thomas Keck, Grossbettlingen (DE); Wolfgang Schiel, Stuttgart (DE); Hristo Zlatanov, Stuttgart (DE)

(73) Assignee: Heliofocus Ltd., Ness Ziona (IL)

( * ) Notice: Subject to any disclaimer, the term of this patent is extended or adjusted under 35 U.S.C. 154(b) by 364 days.

(21) Appl. No.: 13/490,527

(22) Filed: Jun. 7, 2012

(65) Prior Publication Data
US 2012/0312958 A1 Dec. 13, 2012

Related U.S. Application Data (60) Provisional application No. 61/494,873, filed on Jun. 8, 2011, provisional application No. 61/494,875, filed on Jun. 8, 2011.

(51) Int. Cl.
| | |
|---|---|
| *G01J 1/32* | (2006.01) |
| *F24J 2/54* | (2006.01) |
| *F24J 2/16* | (2006.01) |
| *F24J 2/07* | (2006.01) |
| *F24J 2/10* | (2006.01) |

(52) U.S. Cl.
CPC .. *F24J 2/542* (2013.01); *F24J 2/16* (2013.01); *F24J 2002/075* (2013.01); *F24J 2002/1085* (2013.01); *F24J 2002/5441* (2013.01); *F24J 2002/5479* (2013.01); *Y02E 10/47* (2013.01)
USPC ......... 250/203.4; 126/600; 126/696; 136/246

(58) Field of Classification Search
USPC ......... 250/203.1, 203.3, 203.4, 239; 126/569, 126/573, 600, 684, 696; 136/244, 246
See application file for complete search history.

(56) References Cited

U.S. PATENT DOCUMENTS

| | | | |
|---|---|---|---|
| 3,331,072 A | 7/1967 | Pease | |
| 4,047,441 A | 9/1977 | Kellogg | |
| 4,968,355 A | 11/1990 | Johnson | |
| 5,320,403 A | 6/1994 | Kazyak | |
| 5,343,666 A | 9/1994 | Haddad et al. | |

(Continued)

FOREIGN PATENT DOCUMENTS

| | | |
|---|---|---|
| CN | 201488375 U | 5/2010 |
| WO | 2004/013547 | 2/2004 |

(Continued)

OTHER PUBLICATIONS

Brenner et al, "Upgrade of a Large Millimeter Wavelength Radio Telescope for Improved Performance" Proceedings of the IEEE; vol. 82, Issue: 5, May 1994.

(Continued)

*Primary Examiner* — Kevin Pyo
(74) *Attorney, Agent, or Firm* — Daniel J. Swirsky; AlphaPatent Associates Ltd.

(57) ABSTRACT

A sun tracking system for tracking the sun in at least two axes, including a base, a rotating system mounted on the base, a spatial structure assembly having a lower portion at a first peripheral end thereof, and an upper portion at a second peripheral end thereof, the lower portion being more proximal to the base than the upper portion, and an anchoring location at the lower portion, and a torque box assembly at the anchoring location for resisting a torque applied to the spatial structure assembly.

24 Claims, 10 Drawing Sheets

(56) References Cited

U.S. PATENT DOCUMENTS

| | | |
|---|---|---|
| 5,884,963 A | 3/1999 | Esposito et al. |
| 5,963,182 A | 10/1999 | Bassily |
| 5,969,695 A | 10/1999 | Bassily et al. |
| 6,030,007 A | 2/2000 | Bassily et al. |
| 6,214,144 B1 | 4/2001 | Bassily et al. |
| 6,299,240 B1 | 10/2001 | Schroeder et al. |
| 6,330,726 B1 | 12/2001 | Hone et al. |
| 6,384,800 B1 | 5/2002 | Bassily et al. |
| 7,330,160 B1 | 2/2008 | Fleming et al. |
| 7,554,030 B2 | 6/2009 | Shingleton |
| 7,878,346 B1 | 2/2011 | Watts et al. |
| 2004/0004459 A1 | 1/2004 | Bailey |
| 2004/0069897 A1 | 4/2004 | Corcoran |
| 2005/0116460 A1 | 6/2005 | McGill et al. |
| 2010/0007240 A1 | 1/2010 | Kornbluh et al. |
| 2010/0147996 A1 | 6/2010 | Hartshorn et al. |
| 2011/0214666 A1 | 9/2011 | Prahl |
| 2011/0220092 A1 | 9/2011 | Ven |
| 2011/0253195 A1* | 10/2011 | Kim ............................... 136/246 |
| 2012/0011797 A1 | 1/2012 | Green et al. |
| 2014/0182580 A1* | 7/2014 | Marcotte et al. .............. 126/696 |

FOREIGN PATENT DOCUMENTS

| | | |
|---|---|---|
| WO | 2005089176 A2 | 9/2005 |
| WO | 2008/154521 | 12/2008 |
| WO | 2010/067370 | 6/2010 |
| WO | 2011121149 A1 | 10/2011 |
| WO | 2011121153 A1 | 10/2011 |
| WO | 2011151280 A2 | 12/2011 |
| WO | 2011154567 A1 | 12/2011 |
| WO | 2012017109 A1 | 2/2012 |

OTHER PUBLICATIONS

"The design and building of a large dish antenna rotor"; http://www.astrosurf.com/luxorion/dish-antenna-building2.htm.

* cited by examiner

VIEW C

FIG. 8A

FIG. 8B

SPATIAL STRUCTURE ASSEMBLIES

CROSS-REFERENCE TO RELATED APPLICATIONS

Applicant hereby claims priority benefit of U.S. Provisional Patent Application No. 61/494,873, filed on Jun. 8, 2011, and titled "TORQUE BOX ASSEMBLIES," and U.S. Provisional Patent Application No. 61/494,875, filed on Jun. 8, 2011, and titled "SPATIAL STRUCTURES," the disclosures of which are incorporated herein by reference in their entirety.

FIELD OF THE INVENTION

The present invention relates generally to spatial structure assemblies and more particularly to environmentally resilient spatial structure assemblies.

BACKGROUND OF THE INVENTION

Spatial structure assemblies comprise a plurality of components such as rods, beams, cables, wires or plates arranged for supporting a load mounted thereon.

Spatial structure assemblies may be installed outdoors in a sometimes harsh environment. The spatial structure assembly may be subjected to environmental forces such as wind forces, rain, hail, snow and earthquakes, for example.

SUMMARY OF THE INVENTION

There is thus provided in accordance with some embodiments of the invention a sun tracking system for tracking the sun in at least two axes, including a base, a rotating system mounted on the base, a spatial structure assembly having a lower portion at a first peripheral end thereof, and an upper portion at a second peripheral end thereof, the lower portion being more proximal to the rotating system than the upper portion, and an anchoring location at the lower portion, and a torque box assembly at the anchoring location for resisting a torque applied to the spatial structure assembly.

In accordance with some embodiments the torque box assembly includes a space structure truss. Additionally, the torque box assembly includes at least a first and second member wherein a surface area of a cross section of the first member is larger than the surface area of a cross section of the second member. Furthermore, the torque box assembly is designed to resist a torque T resulting from a force F, the force F being applied on the spatial structure assembly at any one of the following orientations: parallel to a horizontal axis of a Cartesian axis system, parallel to a vertical axis of the Cartesian axis system, parallel to a depth axis of the Cartesian axis system or a combination thereof.

In accordance with some embodiments the torque box assembly includes a plurality of members configured with a hollow structural cross section. Additionally, the torque box assembly includes a plurality of members arranged in a cuboid-like configuration with at least one diagonally inclined member extending along at least one surface of the cuboid-like configuration.

In accordance with some embodiments the spatial structure assembly supports a load thereon. Additionally, the load includes a solar concentrator. Moreover, the solar concentrator is operative to concentrate solar radiation and focus the radiation onto a receiver mounted on the spatial structure assembly.

In accordance with some embodiments the rotating system includes at least one piston placed at the lower portion. Additionally, the spatial structure assembly includes at least one frame wherein the mass of the frame increasingly recedes as the distance from the anchoring location towards the upper portion increases. Moreover, the torque box assembly is for resisting a torque applied to the spatial structure assembly, thereby allowing the spatial structure assembly to track the sun at an accuracy of substantially 0.001-0.01 radians.

There is thus provided in accordance with some embodiments of the invention a plural axis sun tracking system, including a base, a spatial structure assembly, a rotating system mounted on the base and rotationally connected to the spatial structure assembly, wherein the spatial structure assembly has a lower portion at a first peripheral end thereof and an upper portion at a second peripheral end thereof, the lower portion more proximal to the rotating system than the upper portion, an anchoring location located at the lower portion for anchoring the spatial structure assembly to the rotating system, and a torque box assembly at the anchoring location for resisting a torque applied to the spatial structure assembly, thereby allowing the spatial structure assembly to track the sun at an accuracy of substantially 0.001-0.01 radians. Additionally, the plural axis tracking system may be a dual axis sun tracking system.

There is thus provided in accordance with some embodiments of the invention a plural axis sun tracking system, including a base, a spatial structure assembly, and a rotating system mounted on the base for rotating the spatial structure assembly, wherein the spatial structure assembly, includes a frame having a lower portion at a first peripheral end of the spatial structure assembly and an upper portion at a second peripheral end of the spatial structure assembly, the lower portion being more proximal to the rotating system than the upper portion, an anchoring location for anchoring the spatial structure assembly to the rotating system, the anchoring location located at the lower portion, wherein the mass of the frame increasingly recedes as the distance from the anchoring location towards the upper portion increases. Accordingly, the frame tapers from the lower portion towards the upper portion, such that the frame is wider at the lower portion than at the upper portion. Additionally, the frame includes a trapezoid-like shape. Alternatively, the frame includes a triangular-like shape.

BRIEF DESCRIPTION OF THE DRAWINGS

The present subject matter will be understood and appreciated more fully from the following detailed description, taken in conjunction with the drawings in which.

DETAILED DESCRIPTION OF THE INVENTION

In the following description, various aspects of the present subject matter will be described. For purposes of explanation, specific configurations and details are set forth in order to provide a thorough understanding of the present subject matter. However, it will also be apparent to one skilled in the art that the present subject matter may be practiced without specific details presented herein without departing from the scope of the present invention. Furthermore, the description omits and/or simplifies some well known features in order not to obscure the description of the subject matter.

Figure 1:
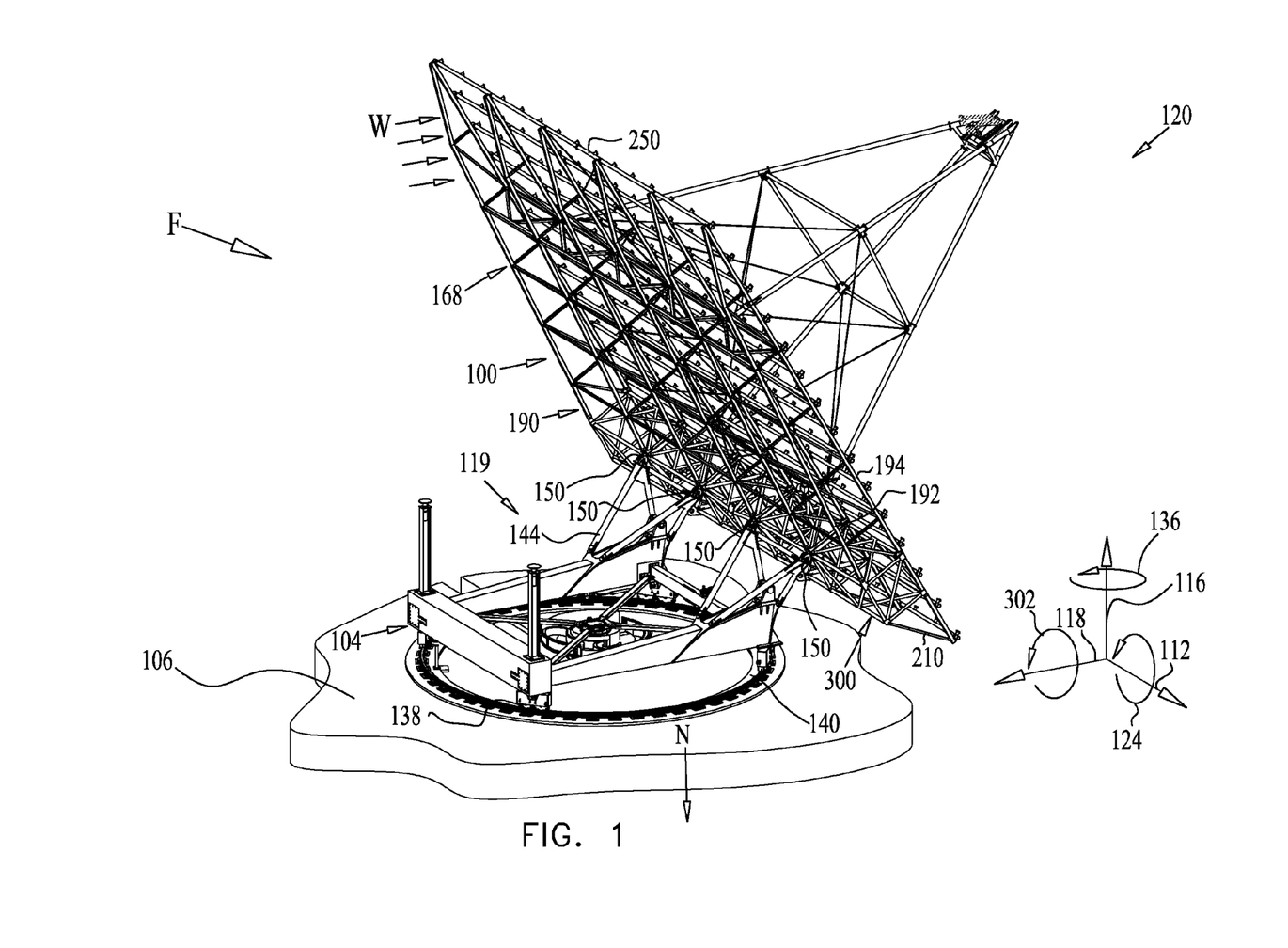
FIG. 1 is a simplified pictorial illustration of a spatial structure assembly, constructed and operative in accordance with an embodiment of the present invention.
Figure 2A:
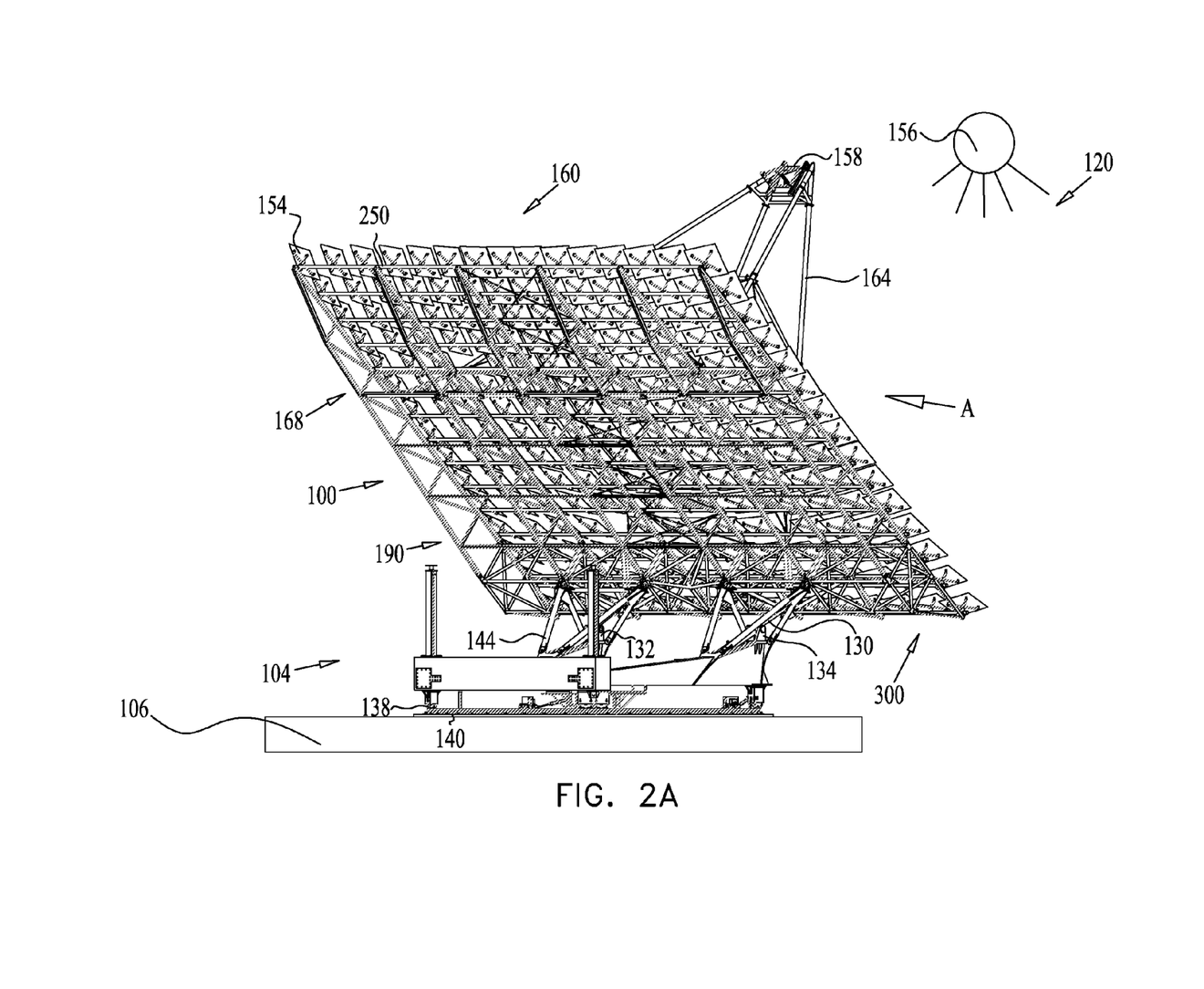
FIGS. 2A and 2B are a simplified pictorial illustration of the spatial structure assembly of FIG. 1 shown supporting solar concentrators and a simplified pictorial illustration shown in the orientation of arrow A in FIG. 2A, respectively.
Figure 2B:
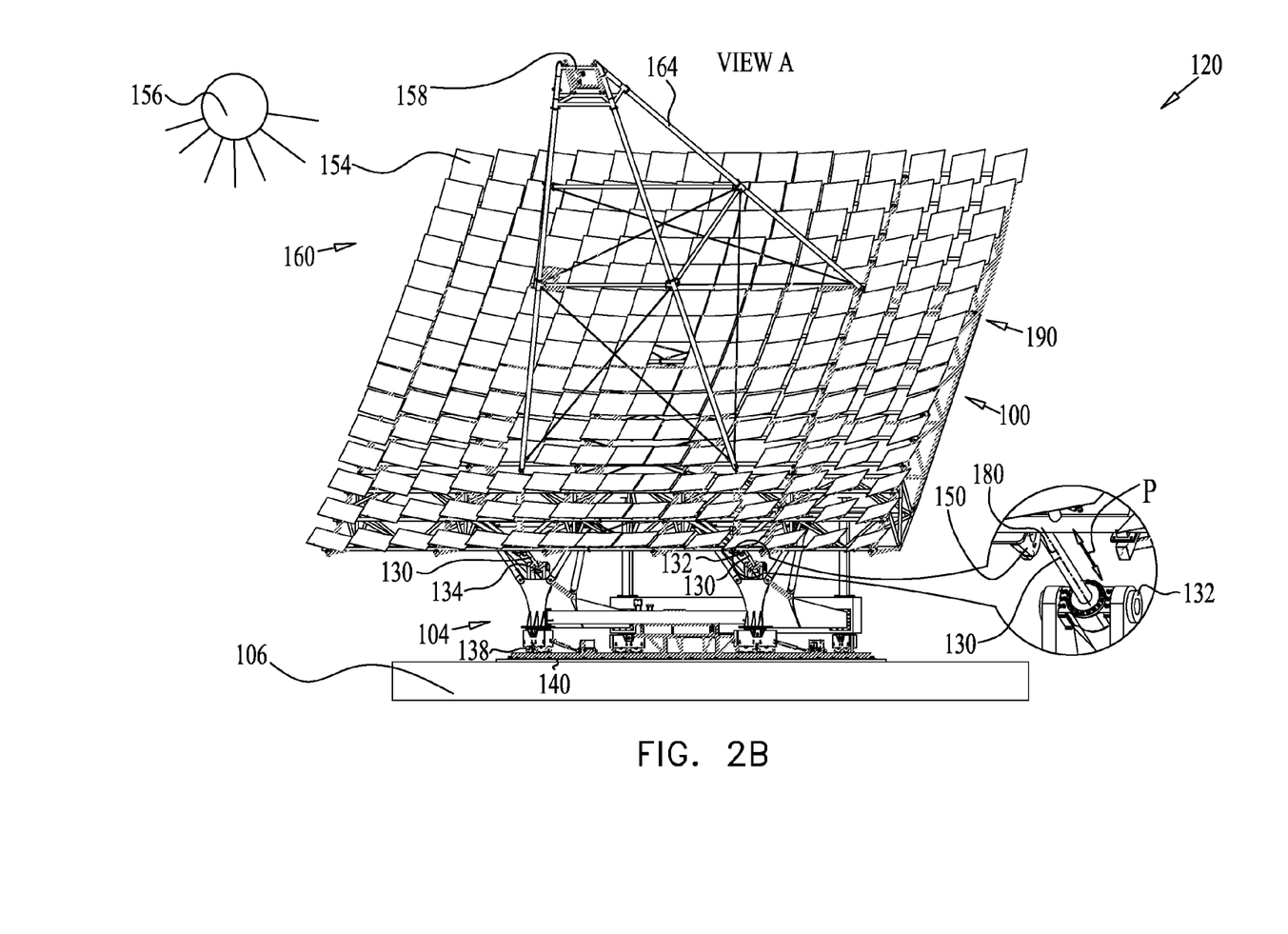

Reference is now made to FIGS. 1-2B, which are a simplified pictorial illustration of a spatial structure assembly 100, and a simplified pictorial illustration of the spatial structure assembly 100 of FIG. 1 shown supporting solar concentrators and a simplified pictorial illustration shown in the orientation of arrow A in FIG. 2A, respectively.

The spatial structure assembly 100 may be mounted on a base 104. The base 104 may be placed on the ground 106 or any other suitable stationary plane. A Cartesian axis system may comprise a horizontal axis 112 (X-axis), a vertical axis 116 (Y-axis) and a depth axis 118 (Z-axis) and is generally aligned with the Earth's (or ground) axes.

The base 104 may comprise a rotating system 119 provided to allow the spatial structure assembly 100 to rotate in any suitable orientation, such as in a dual axis tracking system 120. In other embodiments the tracking system 120 may be any plural axis tracking system, such as a three axis tracking system.

In the embodiment of FIGS. 1, 2A and 2B the rotating system 119 allows the spatial structure assembly 100 to rotate in the dual axis tracking system 120 around horizontal axis 112 in the orientation of an arrow 124. The rotation may be facilitated in any suitable manner by the rotating system 119 comprising pistons 130 (FIG. 2B) protruding from base 104 and rotationally connected to the spatial structure assembly 100 in any suitable manner. For example, the two pistons 130 may be fixed to the spatial structure assembly 100 at respective mounting locations 132 and 134. The pistons 130 are configured to elongate or contract for rotating the spatial structure assembly 100 in the orientation of arrow 124.

The base 104 may rotate around axis 116 in the orientation of an arrow 136. This rotation may be facilitated in any suitable manner such as by rotation of wheels 138 within a circular rail 140 of the rotating system 119.

A plurality of rods 144 may protrude from the base 104 and connect to the spatial structure assembly 100 via connectors 148 (FIG. 7A) at anchoring locations 150. The connectors 148 may be any suitable connectors, such as articulated connectors comprising plates 149, for example.

As seen in FIGS. 1, 2A and 2B the base 104 may be anchored at four locations 150, though it is appreciated that anchoring may be performed at any suitable location by any suitable method, such as welding the rods 144 to the spatial structure assembly 100, for example.

The spatial structure assembly 100 may support any suitable load. In a non-limiting example, as seen in FIGS. 2A and 2B, the load may be an array of concentrators 154 designed to concentrate radiation from the Sun 156 onto a focal point 158. The array of concentrators 154 may form together a solar concentrator 160 which tracks the Sun 156 by rotating the concentrator 160 in the dual axis tracking system 120. In this embodiment the dual axis tracking system 120 is a dual axis sun tracking system. The concentrator 160 may be formed in any suitable shape, such as substantially a dish, a parabola-like shape, a parallelogram-like shape, for example. In the embodiment of FIGS. 2A and 2B concentrator 160 is formed in a rectangle-like shape. In a non-limiting example the concentrator may be formed as a rectangle-like shape with a relatively large length in the range of 300-900 square meters, for example.

Additional concentrators are described in applicant's PCT application PCT/IL2009/001183 which is incorporated herein by reference in its entirety.

The concentrated solar radiation may be transformed in any suitable manner to thermal energy. For example, the solar concentration may be focused onto a receiver (not shown) mounted at focal point 158 and supported by cables 164. A fluid, such as air or any other suitable fluid, may be heated within the receiver by the concentrated solar radiation. Thermal energy within the heated fluid may be provided to any thermal energy consumption system (not shown).

The spatial structure assembly 100 may be subjected to a single or plurality of forces denoted by F (FIG. 1) as follows: The spatial structure assembly 100 may be subjected to gravitational forces, denoted by N, due to the weight (i.e. dead load) of the spatial structure assembly 100 and any load mounted thereon, such as the concentrator 160. The load supported by the spatial structure assembly 100 may be substantially heavy. In a non-limiting example the weight of the spatial structure assembly 100 along with the concentrators 160 may be in the range of 40-80 ton.

The spatial structure assembly 100 may be installed outdoors in a sometimes harsh environment. The spatial structure assembly 100 may be subjected to environmental forces, denoted by W, such as wind forces, rain, hail, snow and earthquakes, for example. For example the average wind force in Southern Israel is estimated at 1200 Kilonewtons.

Additionally, the spatial structure assembly 100 may be subjected to an additional piston-induced force, denoted by P (FIG. 2B), applied by the pistons 130 at locations 132 and 134 during contraction or elongation thereof.

Thus the spatial structure assembly 100 may be generally subjected to a force F which comprises, inter alia, environmental forces W, dead load forces N and piston-induced forces P.

The environmental forces W, such as wind, may appear in a plurality of orientations relative to the ground 106 and relative to the spatial structure assembly 100. Additionally, the environmental forces W may be applied on all of a surface 168 of the spatial structure assembly 100 or only on a portion thereof. For example, a wind force W is shown in FIG. 1 as blowing on an upper area of the surface 168.

The orientation of the dead load forces N is generally downwards parallel to vertical axis 116. The orientation of the piston-induced forces P is generally in the orientation of a longitudinal axis 180 of the pistons 130 (FIG. 2B).

As described hereinabove, the spatial structure assembly 100 may rotate within the dual axis tracking system 120. Therefore the orientation of the total force F, comprising forces W, N and P, relative to surface 168, may change in accordance with the position of the spatial structure assembly 100 within the dual axis tracking system 120 and in accordance with the environmental conditions.

The total force F may comprise a concentrated force, such as the piston-induced force P applied at mounting locations 132 and 134. Additionally or alternatively total force F may comprise a distributed force (i.e. pressure), as exemplified in FIG. 1 showing the wind force W blowing on a portion of surface 168.

The spatial structure assembly 100 may comprise a single or plurality of mutually aligned frames 190. Alternatively, the spatial structure assembly 100 may be formed and arranged in any suitable manner for supporting a load thereon. For example, the spatial structure assembly 100 may be formed as a space structure or space frame. A space structure generally comprises a three-dimensional truss composed of linear elements subjected to compression or tension. Additionally, the spatial structure assembly 100 may be formed as a planar truss, as a tessellated system, as any suitable latticed structure or as a solid structure comprising plates.

Figure 3:
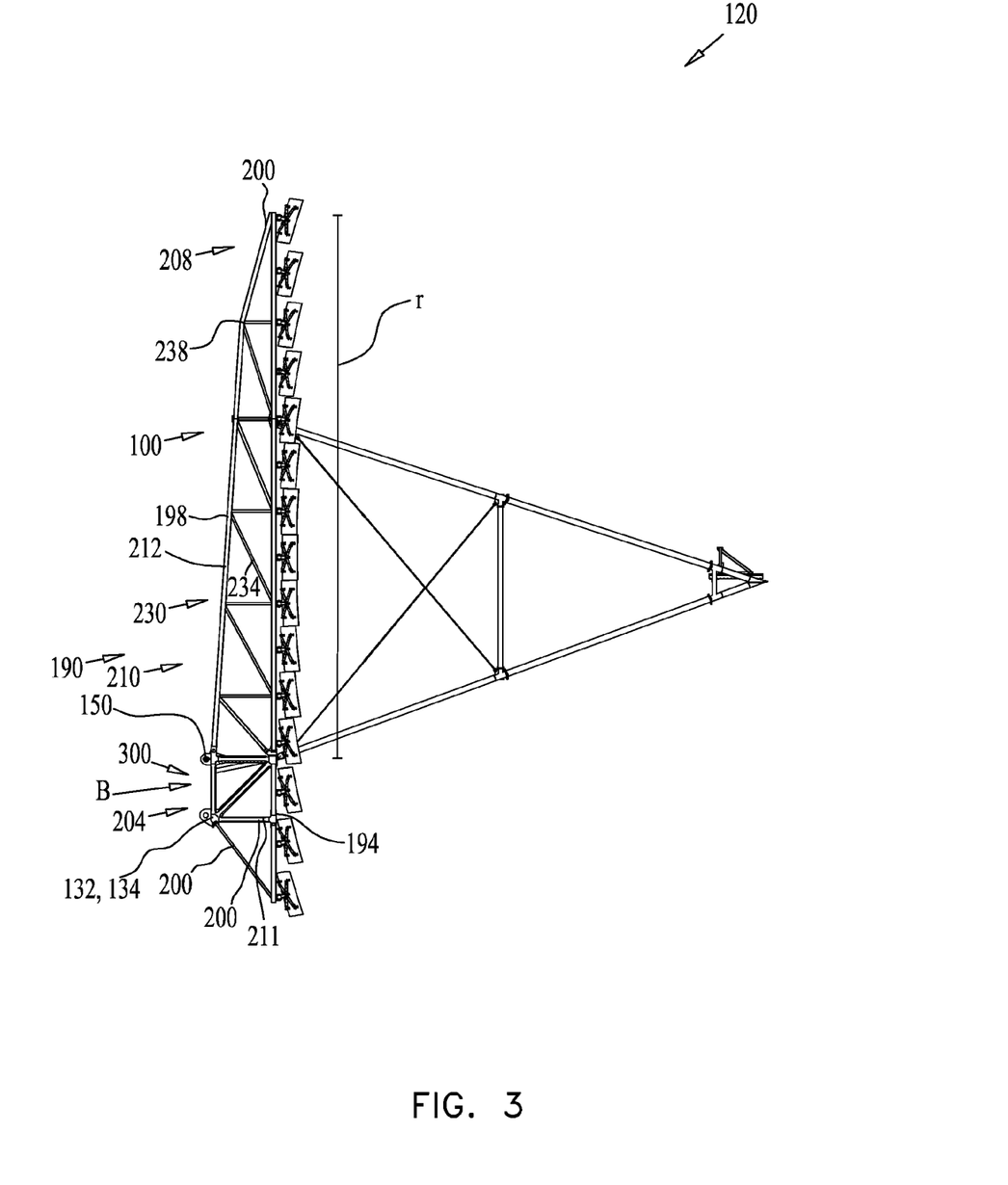
FIG. 3 is a simplified side view illustration of elements of the spatial structure assembly of FIG. 2A.
Figure 4:
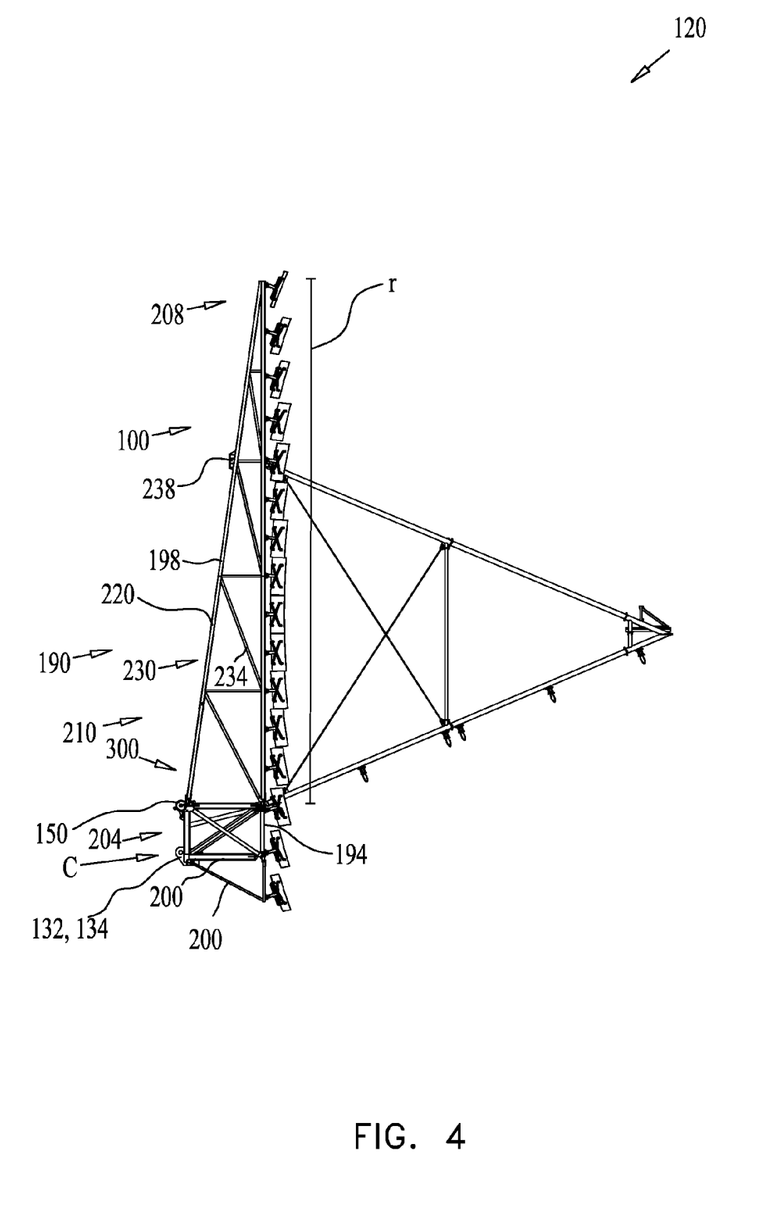
FIG. 4 is a simplified side view illustration of a spatial structure assembly according to another embodiment of the invention.
Figure 5:
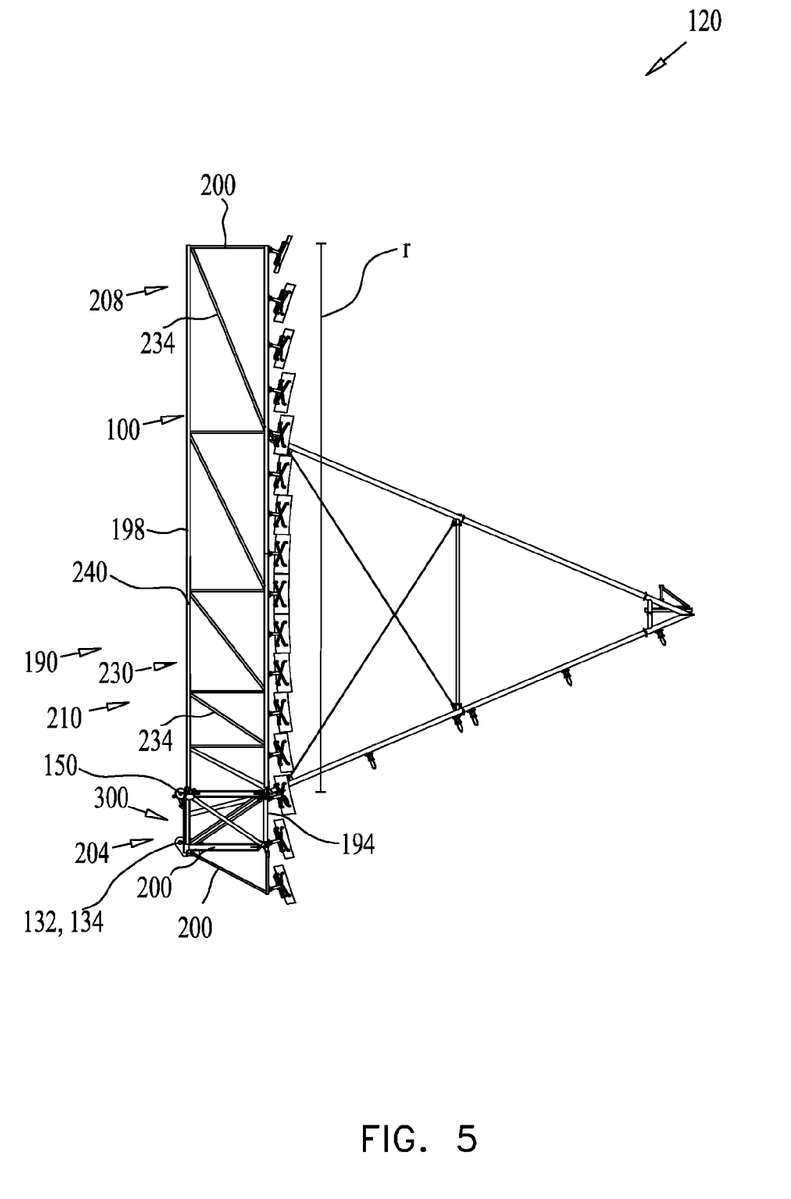
FIG. 5 is a simplified side view illustration of a spatial structure assembly according to yet another embodiment of the invention.

Reference is made to FIGS. 3-5, which are a simplified side view illustration of elements of the spatial structure assembly of FIG. 2A, a simplified side view illustration of a spatial structure assembly according to another embodiment and a simplified side view illustration of a spatial structure assembly according to yet another embodiment, respectively. It is noted that in FIGS. 3-5 the base 104 and rotating system 119 are not shown.

As seen in FIG. 3, frames 190 may comprise a first section comprising a first beam 194, a second section comprising a second beam 198 and a third section comprising connecting beams 200. The frame 190 generally comprises a lower portion 204 at a first peripheral end thereof and in proximity to the rotating system 119 and mounting locations 132 and 134 (FIGS. 1-2B) and an upper portion 208 at a second peripheral end thereof relatively distal to the rotating system 119 and mounting locations 132 and 134.

The lower portion 204 also defines the lower peripheral end of the spatial structure assembly 100 and the upper portion 208 also defines the upper peripheral end of the spatial structure assembly 100.

In accordance with some embodiments the frame 190 may taper towards the upper portion 208. A skilled artisan will appreciate that a torque T is calculated as:

$$T = F \times r$$

Wherein F—is the force F described hereinabove.

r—is a distance measured starting from the anchoring location 150 along the first beam 194 to upper portion 208.

As known in the art in a one end anchored cantilever beam with a concentrated force or a distributed force, the torque T decreases as the distance r from the anchoring location increases. Similarly in the spatial structure assembly 100 the torque T decreases as the distance r from the anchoring location 150 increases. The torque T at anchoring locations 150 of lower portion 204 is the largest. The torque T at upper portion 208 is substantially equal to or very close to zero. Therefore the frame 190 is formed as a tapered frame 210, wherein the frame 210 increasingly tapers as second beam 198 gets increasingly closer to the first beam 194, along increasing distance r and decreasing torque T. Thus a width 211 of the frame is larger at the lower portion 204 than at the upper portion 208.

Forming the spatial structure assembly 100 with tapered frames allows for reducing the mass of the spatial structure assembly 100 without compromising the mechanical stability and strength of the spatial structure assembly 100, since the torque T reduces along the tapered frame, as described. The mass of the tapered frame may be 20-75% lighter than a non-tapered frame.

Reduction of mass of the spatial structure assembly 100 significantly decreases the dead load force N. Reduction of the dead load force N is advantageous wherein the load supported by the spatial structure assembly 100 is relatively large and heavy, such as the concentrator 160 of FIGS. 2A and 2B.

The tapered frame 210 may be configured in any suitable shape. For example, as seen in FIG. 3, the tapered frame 210 may be configured generally in a trapezoid-like shape 212 where the second beam 198 tapers towards the first beam 194. The connecting beams 200 are provided to connect the first beam 194 to the second beam 198 at the lower portion 204 and at the upper portion 208.

The tapered frame 210 in FIG. 4 is configured generally in a triangular-like shape 220 where the second beam 198 tapers towards the first beam 194. The connecting beams 200 connect the first beam 194 to the second beam 198 at lower portion 204. In the examples shown in FIGS. 3 and 4 the tapered frame 210 is formed generally as a right angled trapezoid 212 or a right angled triangle 220 with the second beam 198 being a hypotenuse. It is appreciated that the configuration of the tapered frame 210 may be any suitable configuration such as an equilateral triangle, for example.

The frames 190 may comprise a truss, such as a planar truss 230 including a plurality of members 234 wherein each two adjacent members 234 are joint at a node 238. The truss 230 may comprise any suitable members 234 arranged in any suitable arrangement for providing mechanical strength to the spatial structure assembly 100.

In accordance with another embodiment the frame 190 may be formed in any suitable configuration with a receding mass along distance r. For example, as shown in FIG. 5, the frame 190 may be configured in a generally parallelogram-like configuration 240 with a reducing quantity of truss members 234 along distance r. Thus in proximity to lower portion 204 there is a larger quantity of truss members 234 and in proximity to upper portion 208 there is a smaller quantity of truss members 234, thereby reducing the mass of the frame 190 along distance r.

As seen in FIG. 1, the plurality of frames 190 may be connected therebetween by a single or plurality of coaligned, traversing beams 250 or in any other suitable manner.

Components of the spatial structure assembly 100, such as frames 190 and traversing beams 250 may be formed of any suitable material, such as a metal. For example the components may be formed of steel, such as standard structural steel. The components may be designed as tubes with any suitable cross section, typically with a hollow structural cross section, such as a circular hollow cross section or a rectangular hollow cross section. Alternatively the components may be designed in any suitable configuration such as rods, cables, wires or plates, for example.

Figure 6A:
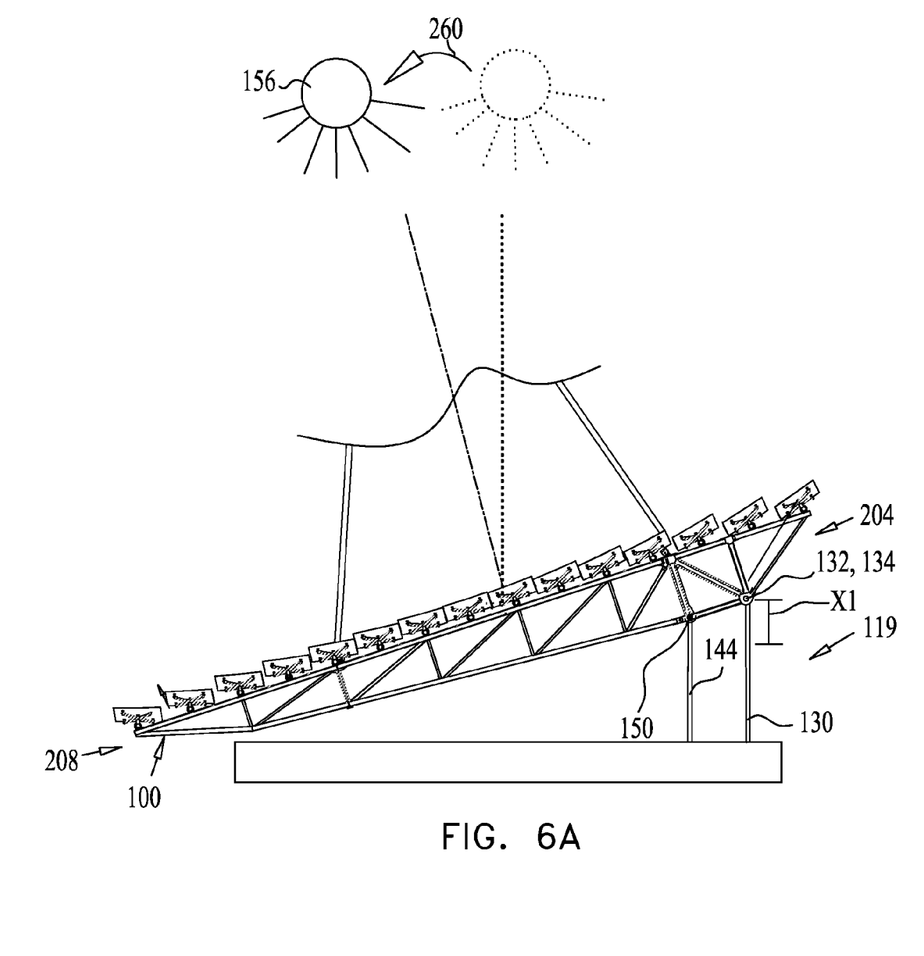
FIGS. 6A and 6B are a simplified pictorial illustration of a spatial structure assembly of FIG. 3 shown with an anchoring location in accordance with a first embodiment and an anchoring location in accordance with a second embodiment, respectively.
Figure 6B:
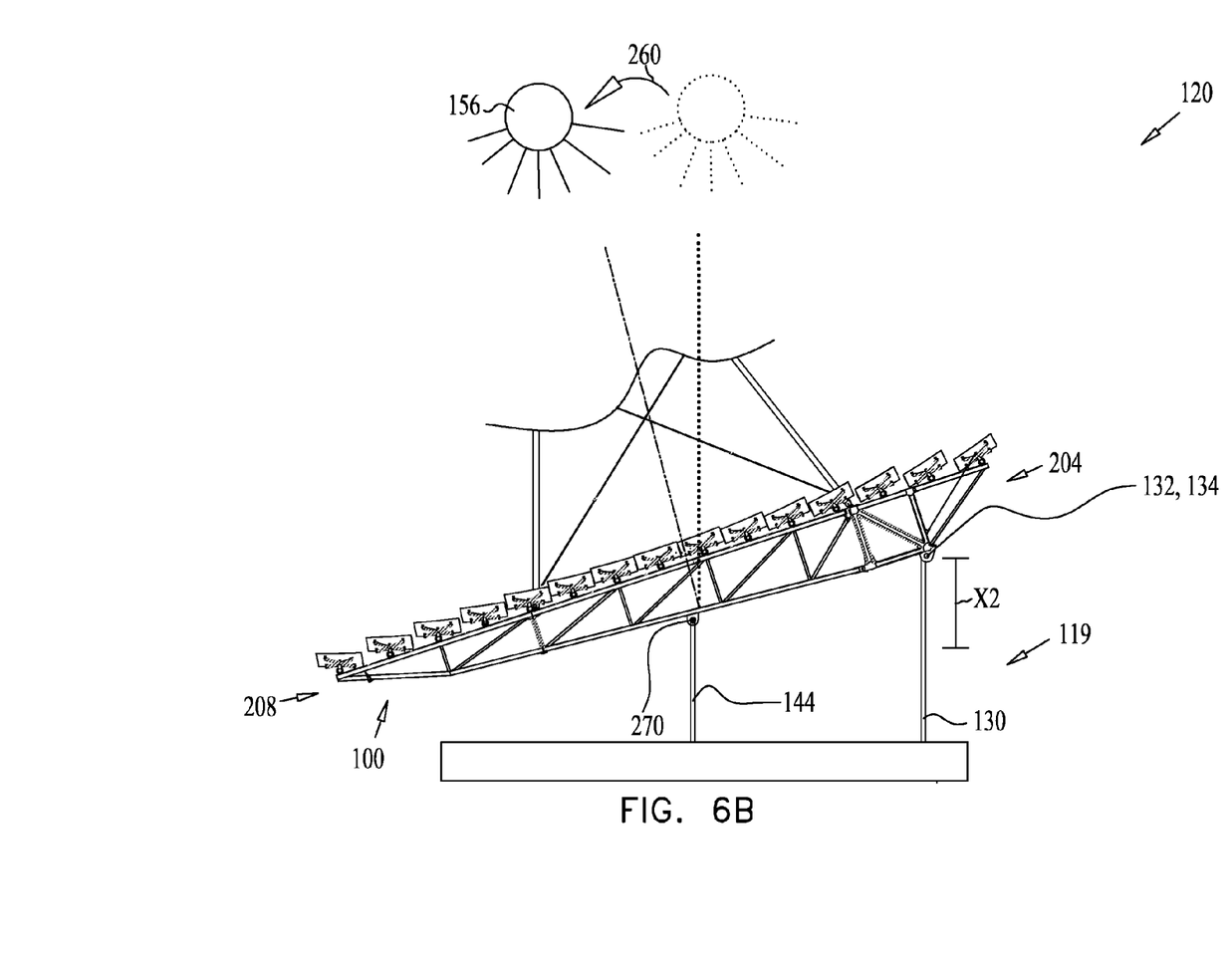

Reference is made to FIGS. 6A and 6B, which are a simplified pictorial illustration of a spatial structure assembly of FIG. 3 shown with an anchoring location in accordance with a first embodiment and an anchoring location in accordance with a second embodiment, respectively. As seen in FIG. 6A, the anchoring location 150 is at the lower portion 204 of the spatial structure assembly 100 or may be in proximity to the lower portion 204. The mounting locations 132 and 134 may also be placed at the lower portion 204 of the spatial structure assembly 100 or may be in proximity to the lower portion 204. Placing the mounting locations 132 and 134 at or in proximity to the lower portion 204 allows the pistons 130 or any other rotating device to be relatively short and simple.

This can be seen by comparing FIG. 6A to FIG. 6B. In FIG. 6A the anchoring location 150 is at lower portion 204. The spatial structure assembly 100 is rotated by the pistons 130 about axis 112 in the orientation of arrow 124 (FIG. 1) so as to track the sun 156 which has moved in the orientation of an arrow 260. To facilitate the rotation of the spatial structure assembly 100 the piston 130 elongates to a distance of X1. Turning to FIG. 6B it can be seen that the anchoring location in this embodiment is at a central location 270 of spatial structure assembly 100 intermediate lower portion 204 and upper portion 208. In order to track the sun 156 the spatial structure assembly 100 is rotated in the orientation of arrow 260 to the same location of the sun 156 as in FIG. 6A. To facilitate the rotation of the spatial structure assembly 100 the piston 130 elongates to a distance of X2. It can be seen that the distance X2 is significantly greater than the distance X1. This shows that by placing the anchoring location 150 at lower portion 204 or in proximity thereto, the elongation (or contraction) of piston 130 is minimal allowing the piston 130 to be relatively short and simple. In the embodiment of FIG. 6B, wherein the anchoring location is at a central location 270, the operation of the relatively long pistons may require additional components such as gears, pivots or joints for accurately rotating the spatial structure assembly 100.

Simple and relatively short pistons 130 or any other rotating device are particularly significant for accurate tracking of a relatively large spatial structure assembly 100, such as a spatial structure assembly 100 in the range of 300-900 square meters, for example.

In accordance with some embodiments the tracking accuracy of the spatial structure assembly 100 is substantially 0.001-0.01 radians. In accordance with some embodiments the tracking accuracy of the spatial structure assembly 100 is substantially 0.001-0.009 radians. In accordance with some embodiments the tracking accuracy of the spatial structure assembly 100 is substantially 0.001-0.005 radians.

A skilled artisan will appreciate that the torque T applied at the lower portion 204 may increase upon placement of the anchoring location 150 at lower portion 204 or in proximity thereto and distally to the central location 270.

In accordance with some embodiments a device for resisting the torque T may be introduced within the dual axis tracking system 120. For example, as seen in FIGS. 1-6B the spatial structure assembly 100 may comprise a torque box assembly 300. The torque box assembly 300 may be placed intermediate mounting locations 132 and 134 and anchoring location 150. It is noted that the torque box assembly 300 may be placed at the anchoring location 150 which includes placement of the torque box assembly 300 in proximity to the anchoring location 150 or at any location distal to the central location 270.

The torque box assembly 300 may comprise any suitable configuration for resisting the torque T applied to the spatial structure assembly 100 due to the force F. As described hereinabove, the force F may be applied to the spatial structure assembly 100 at various orientations due to the rotation of the spatial structure assembly 100 within the dual axis tracking system 120 and due to the environment forces W, which may appear in a plurality of orientations. Therefore the spatial structure assembly 100 may be subjected to the torque T in a plurality of orientations, such as in the orientation of arrow 124 surrounding horizontal axis 112 (FIG. 1), orientation of arrow 136 surrounding vertical axis 116, orientation of an arrow 302 surrounding depth axis 118 or a combination thereof.

Embodiments of torque box assemblies are shown in FIGS. 7A-8B. It is appreciated that the torque box assemblies may comprise any suitable configuration.

Figure 7A:
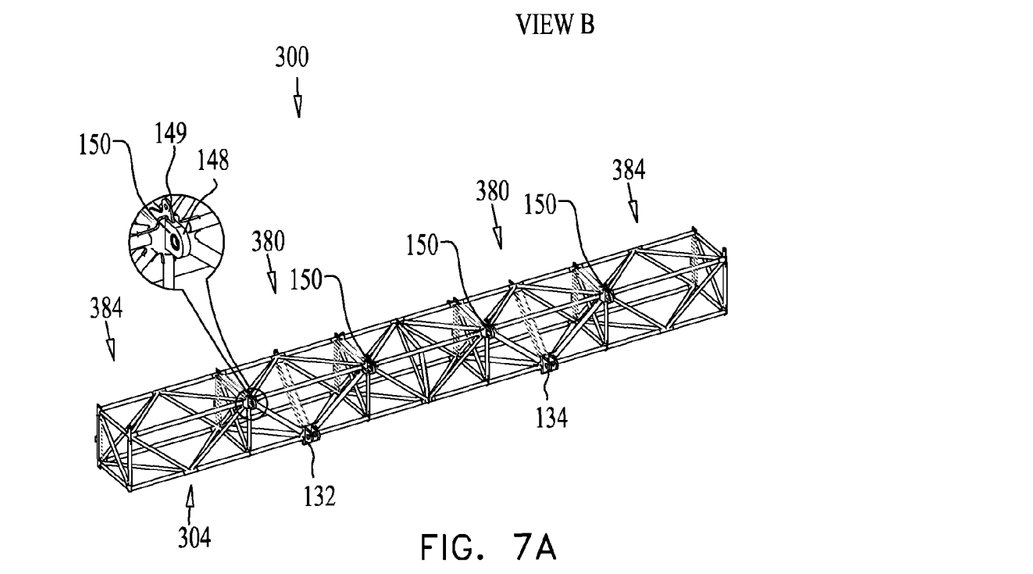
FIG. 7A and FIG. 7B are a simplified pictorial illustration of a torque box assembly shown in the orientation of arrow B in FIG. 3 and a simplified pictorial illustration of a subassembly of the torque box assembly, respectively.
Figure 7B:
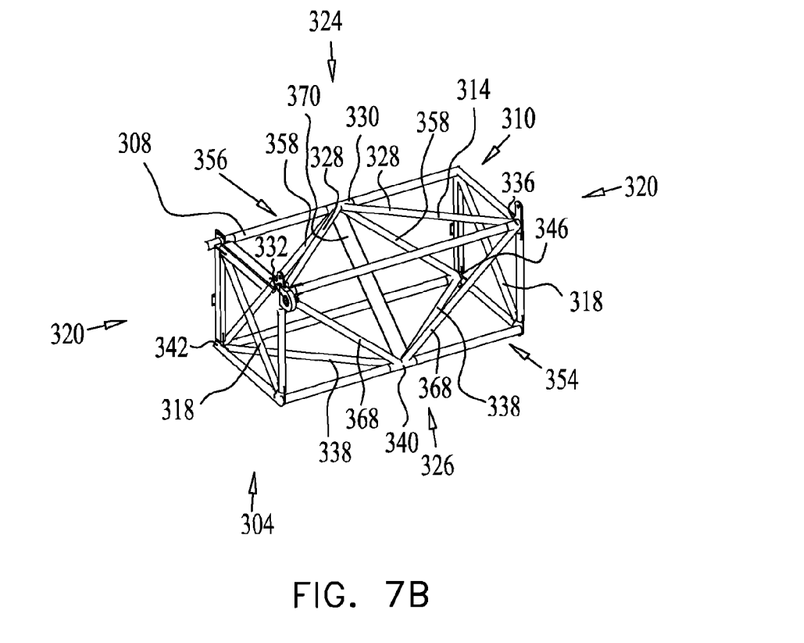

Reference is made to FIGS. 7A and 7B, which are a simplified pictorial illustration of a torque box assembly 300 shown in the orientation of arrow B in FIG. 3 and a simplified pictorial illustration of a subassembly 304 of the torque box assembly 300, respectively. As seen in FIG. 7A, the torque box assembly 300 may comprise a generally reinforced space structure truss including a plurality of adjacent subassemblies 304.

The subassembly 304, as shown in FIG. 7B, may comprise a plurality of members 308 arranged in any suitable manner such as a cuboid-like configuration 310 with generally diagonally inclined members 314 provided to enhance the strength and torque resistance of the torque box assembly 300. The diagonal members 314 may be provided at any suitable location within the cuboid-like configuration 310. For example a first diagonal member 318 may be provided at side surfaces 320 of the cuboid-like configuration 310. Additional diagonal members may be provided at an upper surface 324 and a lower surface 326 of the cuboid-like configuration 310. For example, first and second diagonal members 328 may extend from an upper central node 330. The first member 328 may extend to a corner 332 and the second member 328 may extend to an adjacent corner 336 of upper surface 324. First and second diagonal members 338 may extend from a lower central node 340. The first member 338 may extend to a corner 342 and the second member 338 may extend to an adjacent corner 346 of lower surface 326.

Additional diagonal members may be provided at a front surface 354 and a back surface 356 of the cuboid-like configuration 310. For example, first and second diagonal members 358 may extend from upper central node 330. The first member 358 may extend to corner 342 and the second member 358 may extend to an adjacent corner 346 of back surface 356. First and second diagonal members 368 may extend from lower central node 340. The first member 368 may extend to corner 332 and the second member 368 may extend to adjacent corner 336 of front surface 354.

In accordance with some embodiments additional members may be provided to enhance the strength and torque resistance of the torque box assembly 300. For example a traversing member 370 may extend from upper central node 330 to lower central node 340. In the embodiment shown in FIG. 7A, traversing members 370 are provided in generally central subassemblies 380, which are in proximity to mounting location 132 and 134 and anchoring locations 150. The torque T may be relatively large at mounting location 132 and 134 due to the rotating system 119 mounted to the torque box assembly 300 at mounting locations 132 and 134 and may also be relatively large at the anchoring locations 150, as described hereinabove. Therefore the traversing members 370 are provided in the central subassemblies 380 for enhancing their torque resistance.

Figure 8A:
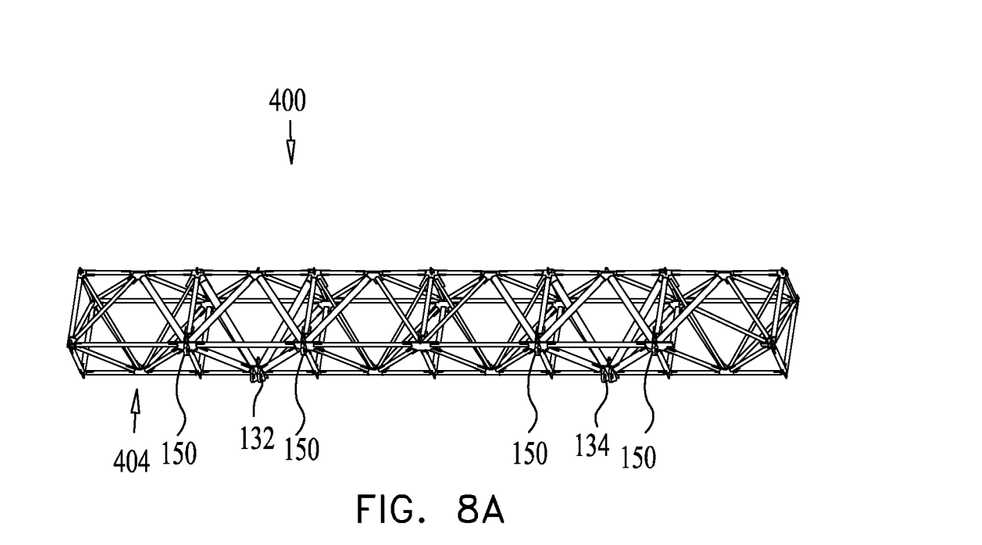
FIG. 8A and FIG. 8B are a simplified pictorial illustration of a torque box assembly shown in the orientation of arrow C in FIG. 4 and a simplified pictorial illustration of a subassembly of the torque box assembly, respectively.
Figure 8B:
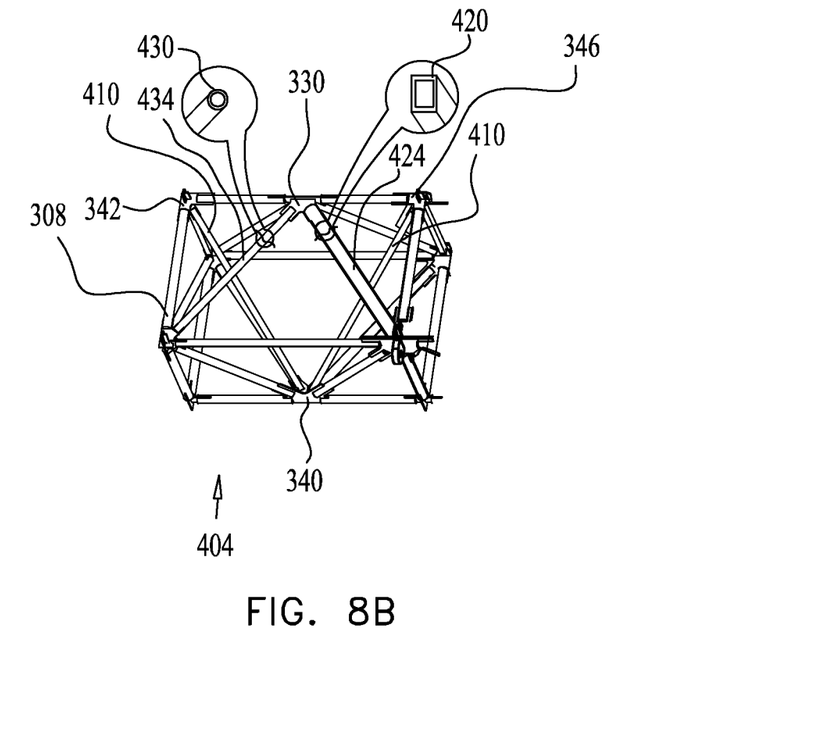

Reference is made to FIGS. 8A and 8B, which are a simplified pictorial illustration of a torque box assembly 400 shown in the orientation of arrow C in FIG. 4 and a simplified pictorial illustration of a subassembly 404 of the torque box assembly 400, respectively. As seen in FIGS. 8A and 8B, the subassembly 404 may be substantially similar to the subassembly 304 in FIGS. 7A and 7B. Subassembly 404 may additionally comprise a first and second traversing member 410 extending from lower central node 340. The first member 410 may extend to corner 342 and the second member 410 may extend to adjacent corner 346.

Members 308 of torque box assembly 300 of FIGS. 7A and 7B and torque box assembly 400 of FIGS. 8A and 8B may be designed as tubes with any suitable cross section, typically with a hollow structural portion cross section, such as a circular hollow cross section or a rectangular hollow cross section. Alternatively the components may be designed in any suitable configuration such as cables, wires or plates, for example.

The different members 308 may be designed with different cross section sizes and/or different cross section shapes. For example, a cross section 420 of a member 424 in FIG. 8B comprises a rectangular hollow cross section. A cross section 430 of a member 434 comprises a circular hollow cross section. The surface area of cross section 420 is shown to be larger than the surface area of cross section 430. As described hereinabove, the torque T may be relatively large at mounting locations 132 and 134 or anchoring locations 150. Therefore, it is advantageous to structure the torque box assemblies 300 or 400 with at least some members, comprising a larger cross section surface area or diameter, than other members, particularly in proximity to the mounting locations 132 and 134 or anchoring locations 150, while not adding unnecessary mass to other members.

The members 308 may be formed of any suitable material, such as a metal. For example the components may be formed of steel, such as standard structural steel.

The torque box assembly 300 or 400 may be placed at any suitable location within the spatial structure assembly 100. As described hereinabove, the torque T may be largest at anchoring locations 150. Therefore it is advantageous to place the torque box assembly 300 in proximity to the anchoring locations 150.

The torque box assembly may comprise any suitable configuration, such as a latticed structure comprising a plurality of members. The latticed structure may be designed as the space structure truss of torque box assembly 300 and 400. Alternatively, the latticed structure may be designed as a planar truss. Moreover, the torque box assembly may comprise solid plates or slabs or generally any suitable configuration operative to resist a torque, torsion or a twisting force applied to the spatial structure assembly 100.

In accordance with some embodiments providing the spatial structure assembly 100 with a torque box assembly allows most of the force F and torque T, applied to the spatial structure assembly 100, to be transferred to the torque box assembly 300 or 400. This allows the spatial structure assembly 100 to be formed with a relatively simple and lightweight structure, such as the frames 190 and traversing beams 250. In this simple structure most of the force F and torque T applied to the spatial structure assembly 100 is transferred by frames 190 and traversing beams 250 to the torque box assembly without bearing most of the force F and torque T. The torque box assembly is operative to resist the force F and torque T, as described hereinabove.

Forming the spatial structure assembly 100 with a tapered or receding mass frame and/or with a torque box assembly, enhances the mechanical stability of the spatial structure assembly 100. The tapered or receding mass frame reduces the spatial structure assembly mass. Thus the force F, due to the dead load N, is reduced. The torque box assembly provides resistance to torque T, twist or torsion applied to the spatial structure assembly 100 at any possible orientation. In a plural or dual axis tracking system 120 a mechanically stable and environmentally resilient spatial structure assembly 100 enhances the tracking accuracy of the tracking system 120, such as substantially in the range of 0.001-0.01 radians.

In some embodiments the spatial structure assembly 100 supports a large and heavy load, such as the solar concentrator 160 and a receiver mounted thereon. The solar concentrator 160 may be relatively large and heavy and the receiver may also add additional weight. It is known in the art that the stiffness of a structure decreases as the load is larger and heavier. Therefore forming the spatial structure assembly 100 with a tapered or receding mass frame is advantageous due to the mass reduction resulting thereby. Forming the spatial structure assembly 100 with a torque box assembly may compensate for the stiffness reduced by the large and heavy load supported by the spatial structure assembly 100.

It is noted that the load supported by the spatial structure assembly 100 of FIG. 1 may comprise any suitable load, such as a heliostat which concentrates solar radiation and focuses the concentrated radiation on to a central tower, as known in the art. Additionally the load may be a billboard or a satellite, such as a stationary satellite dish, for example.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

What is claimed is:

1. A sun tracking system for tracking the sun in at least two axes, comprising:
    a base;
    a rotating system mounted on the base;
    a spatial structure assembly having a lower portion at a first peripheral end thereof, and an upper portion at a second peripheral end thereof, the lower portion being more proximal to the rotating system than the upper portion, and an anchoring location at the lower portion; and
    a torque box assembly at the anchoring location for resisting a torque applied to the spatial structure assembly.

2. A sun tracking system according to claim 1 wherein the torque box assembly comprises a space structure truss.

3. A sun tracking system according to claim 1 wherein the torque box assembly comprises at least a first and second member wherein a surface area of a cross section of the first member is larger than the surface area of a cross section of the second member.

4. A sun tracking system according to claim 1 wherein the torque box assembly is designed to resist a torque T resulting from a force F, the force F being applied on the spatial structure assembly at any one of the following orientations: parallel to a horizontal axis of a Cartesian axis system; parallel to a vertical axis of the Cartesian axis system, parallel to a depth axis of the Cartesian axis system or a combination thereof.

5. A sun tracking system according to claim 1 wherein the torque box assembly comprises a plurality of members configured with a hollow structural cross section.

6. A sun tracking system according to claim 1 wherein the torque box assembly comprises a plurality of members arranged as a cuboid-like configuration with at least one diagonally inclined member extending along at least one surface of the cuboid-like configuration.

7. A sun tracking system according to claim 1 wherein the spatial structure assembly supports a load thereon.

8. A sun tracking system according to claim 7 wherein the load comprises a solar concentrator.

9. A sun tracking system according to claim 8 wherein the solar concentrator is operative to concentrate solar radiation and focus the radiation onto a receiver mounted on the spatial structure assembly.

10. A sun tracking system according to claim 1 wherein the rotating system comprises at least one piston placed at the lower portion.

11. A sun tracking system according to claim 1 wherein the spatial structure assembly comprises at least one frame wherein the mass of the frame increasingly recedes as the distance from the anchoring location towards the upper portion increases.

12. A sun tracking system according to claim 1 wherein the torque box assembly is for resisting a torque applied to the spatial structure assembly, thereby allowing the spatial structure assembly to track the sun at an accuracy of substantially 0.001-0.01 radians.

13. A plural axis sun tracking system, comprising:
a base;
a spatial structure assembly;
a rotating system mounted on the base and rotationally connected to the spatial structure assembly,
wherein the spatial structure assembly has:
a lower portion at a first peripheral end thereof and an upper portion at a second peripheral end thereof, the lower portion more proximal to the rotating system than the upper portion;
an anchoring location located at the lower portion for anchoring the spatial structure assembly to the rotating system; and
a torque box assembly at the anchoring location for resisting a torque applied to the spatial structure assembly, thereby allowing the spatial structure assembly to track the sun at an accuracy of substantially 0.001-0.01 radians.

14. A plural axis sun tracking system according to claim 13 wherein the plural axis tracking system is a dual axis sun tracking system.

15. A plural axis sun tracking system according to claim 13 wherein the torque box assembly comprises a space structure truss.

16. A plural axis sun tracking system according to claim 13 wherein the torque box assembly comprises at least a first and second member wherein a surface area of a cross section of the first member is larger than the surface area of a cross section of the second member.

17. A plural axis sun tracking system according to claim 13 wherein said torque box assembly is designed to resist a torque T resulting from a force F, the force F being applied on the spatial structure assembly at any one of the following orientations: parallel to a horizontal axis of a Cartesian axis system; parallel to a vertical axis of the Cartesian axis system, parallel to a depth axis of the Cartesian axis system or a combination thereof.

18. A plural axis sun tracking system according to claim 13 wherein said torque box assembly comprises a plurality of members configured with a hollow structural cross section.

19. A plural axis sun tracking system according to claim 13 wherein said torque box assembly comprises a plurality of members arranged as a cuboid-like configuration with at least one diagonally inclined member extending along at least one surface of the cuboid-like configuration.

20. A plural axis sun tracking system according to claim 13 wherein the spatial structure assembly supports a load thereon.

21. A plural axis sun tracking system according to claim 20 wherein the load comprises a solar concentrator.

22. A plural axis sun tracking system according to claim 21 wherein the solar concentrator is operative to concentrate solar radiation and focus the radiation onto a receiver mounted on the spatial structure assembly.

23. A plural axis sun tracking system according to claim 13 wherein the rotating system comprises at least one piston placed at the lower portion.

24. A plural axis sun tracking system according to claim 13 wherein the spatial structure assembly comprises at least one frame wherein the mass of the frame increasingly recedes as the distance from the anchoring location towards the upper portion increases.

* * * * *